United States Patent [19]

Kerrn-Jespersen et al.

[11] Patent Number: 5,667,688

[45] Date of Patent: Sep. 16, 1997

[54] PROCESS FOR THE PURIFICATION OF POLLUTED WATER

[75] Inventors: Jens Peter Kerrn-Jespersen, Hellerup; Mogens Henze, Nærum, both of Denmark

[73] Assignee: T. Kruger Systems AS, Søborg, Denmark

[21] Appl. No.: 632,343

[22] Filed: Apr. 10, 1996

Related U.S. Application Data

[63] Continuation of Ser. No. 244,949, filed as PCT/DK92/00397, Dec. 23, 1992, published as WO93/13023, Jul. 8, 1993, abandoned.

[30] Foreign Application Priority Data

Dec. 23, 1991 [DK] Denmark ................... 2062/91

[51] Int. Cl.$^6$ ..................... C02F 3/30
[52] U.S. Cl. ............ 210/605; 210/617; 210/622; 210/624; 210/195.1; 210/195.3; 210/903; 210/906
[58] Field of Search ............ 210/605, 615, 210/617, 618, 622, 624, 626, 630, 195.1, 195.3, 259, 903, 906

[56] References Cited

U.S. PATENT DOCUMENTS

| | | | |
|---|---|---|---|
| 3,817,857 | 6/1974 | Jorpey | 210/903 |
| 3,957,632 | 5/1976 | Knopp et al. | 210/903 |
| 4,056,465 | 11/1977 | Spector | 210/605 |
| 4,179,374 | 12/1979 | Savage | 210/903 |
| 4,800,021 | 1/1989 | Desbos | 210/605 |
| 4,867,883 | 9/1989 | Daigger et al. | 210/605 |
| 4,915,841 | 4/1990 | Lagana et al. | 210/605 |

FOREIGN PATENT DOCUMENTS

| | | |
|---|---|---|
| 0014394 | 4/1983 | European Pat. Off. . |
| 0247212 | 12/1987 | European Pat. Off. . |
| 4001855 | 7/1991 | Germany . |
| 58-199098 | 11/1983 | Japan . |
| 60-193596 | 10/1985 | Japan . |
| 61-90795 | 5/1986 | Japan . |
| 61-242697 | 10/1986 | Japan . |
| 295498 | 4/1990 | Japan . |
| 2026462 | 2/1980 | United Kingdom . |
| 2044746 | 10/1980 | United Kingdom . |
| WO90/00158 | 1/1990 | WIPO . |

*Primary Examiner*—Christopher Upton
*Attorney, Agent, or Firm*—Watson Cole Stevens Davis, P.L.L.C.

[57] ABSTRACT

Process and plant for biological purification of polluted water wherein the polluted water is successively subjected to an anaerobic, anoxic and aerobic treatment in the presence of microorganisms, and wherein the anaerobic and the anoxic treatment are carried out in the presence of one or more microorganism cultures which are different from the microorganism culture used in the aerobic treatment. Hereby better exploitation of organic matter in the water is obtained thus improving the removal of nitrogen, and an increased reaction rate per unit mass of biomass is obtained thereby allowing the amount of biomass to be reduced or the total reaction rate of the plant to be increased.

15 Claims, 3 Drawing Sheets

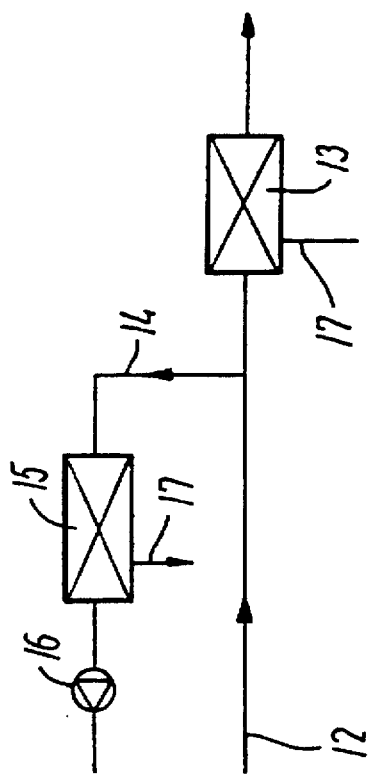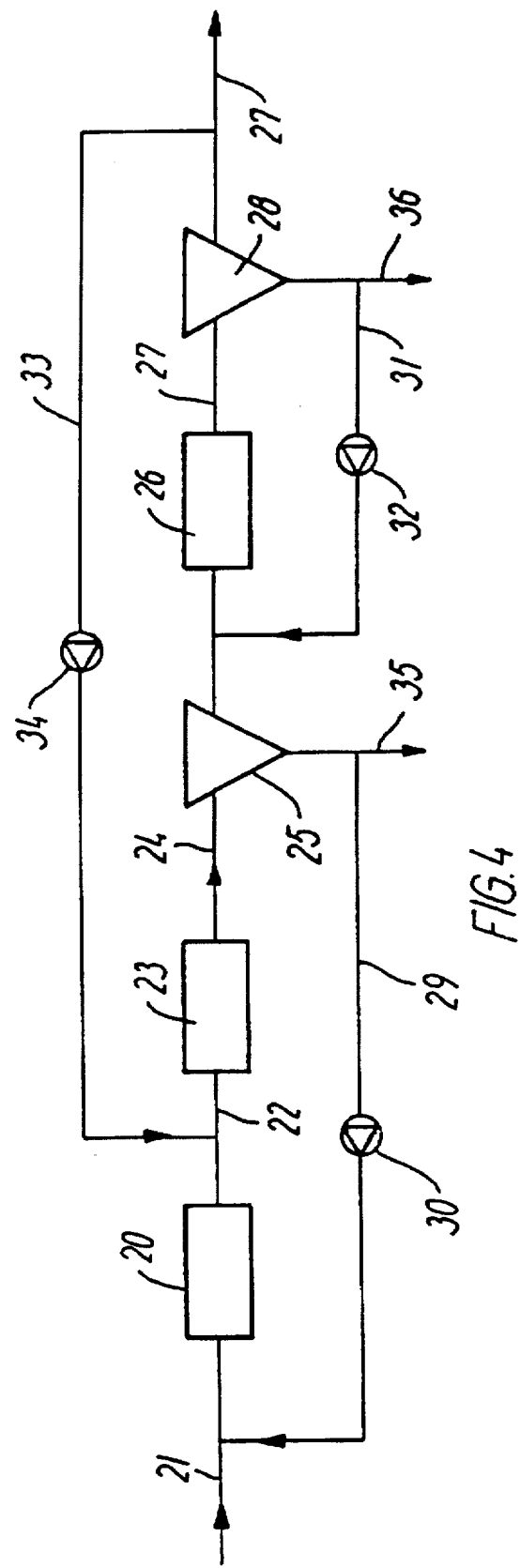
FIG.3
FIG.4

PROCESS FOR THE PURIFICATION OF POLLUTED WATER

This application is a continuation of application Ser. No. 08/244,949, filed as PCT/DK92/00397, Dec. 23, 1992, published as WO93/13023, Jul. 8, 1993, now abandoned.

BACKGROUND OF THE INVENTION

1. Field of the Invention

The invention relates to a process for the biological purification of polluted water, such as waste water, wherein the polluted water is successively subjected to an anaerobic, an anoxic and an aerobic treatment in the presence of micro-organisms in order to reduce the nitrogen and phosphorus contents of the water.

2. The Prior Art

The ever increasing eutrophication of rivers, lakes and seas has resulted in more and more countries making requirements for the purification of waste water, in particular for the removal of nitrogen and phosphorus, and in the existing requirements becoming more and more strict.

Various processes for the biological purification of waste water are known wherein at least a partial removal of nitrogen and phosphorus from the waste water is effected. Such known processes for the purification of waste water using bacteria are disclosed in i.a. DK patents Nos. 149,767 and 153,832.

In the known processes for the biological removal of nitrogen and phosphorus from waste water, the amount of easily decomposable organic matter contained in the waste water is often a limiting factor in the effectiveness of the processes, and where the waste water content of easily decomposable organic matter is insufficient, it is often necessary to add organic matter in order to obtain a desired degree of purification.

The biological removal of phosphorus from waste water is a result of the presence of phosphorus-accumulating bacteria which, in anaerobic conditions, absorb easily decomposable organic matter from the untreated waste water, which organic matter is stored in the form of, e.g., polyhydroxy butyrate (PHB). The bacteria acquire the energy to perform such storing by decomposing polyphosphate from an intracellular storage. Hereby orthophosphate ions are produced which are released to the liquid phase.

When the phosphorus-accumulating bacteria are subsequently subjected to aerobic conditions, the storage of organic matter is consumed as oxygen works as an oxidant. The bacteria use the energy thus produced partly for the absorption of orthophosphate ions from the liquid phase and for the accumulation thereof in the form of polyphosphate and partly for the basic metabolism and growth of the phosphorus-accumulating bacteria.

The removal of phosphorus from the waste water is subsequently achieved by removing the excess production of phosphorus-accumulating bacteria at a point in the process when their polyphosphate storages are full.

The removal of nitrogen is based on a nitrification followed by a denitrification. The nitrification which is effected in aerobic conditions consists in oxidiation of ammonia nitrogen into nitrate simultaneously with a decomposition of available organic matter, if any, whereas the denitrification which is effected in anoxic conditions consists in the consumption of organic matter using nitrate ions as oxidants. In this oxidation nitrate nitrogen is reduced to free nitrogen ($N_2$) which is released in its gaseous form.

Part of the phosphorus-accumulating bacteria are also capable of consuming stored organic matter in anoxic conditions as nitrate acts as an oxidant. As it is the case when the consumption of organic matter is effected with the use of oxygen as an oxidant, the energy produced in anoxic conditions is used partly for the absorption and for the accumulation of phosphate in the form of polyphosphate and partly for the growth of the phosphorus-accumulating bacteria.

When nitrate acts as an oxidant as it is the case in the anoxic conditions described above, a reduction of nitrate into free nitrogen takes place as disclosed above, the free nitrogen being released in gaseous form. This means that the organic matter absorbed by the phosphorus-accumulating bacteria using nitrate as an oxidant is used for phosphorus absorption and accumulation as well as for denitrification.

Tests have shown that in an active-sludge method, such as the ones described above wherein a mixture of micro-organisms are successively subjected to anaerobic, anoxic and aerobic conditions, only about half of the phosphorus-accumulating bacteria are capable of absorbing and accumulating phosphate ions in anoxic conditions and thus of using nitrate as an oxidant. Thus, only half of the total amount of organic matter absorbed by the phosphorus-accumulating bacteria is used for denitrification.

If all of the phosphorus-accumulating bacteria were capable of using nitrate as an oxidant, it would be possible to obtain an improved nitrogen removal without the addition of organic matter to waste water which is comparatively poor in organic matter as, in that case, there would be more organic matter available for the nitrogen removal, i.e., the denitrification.

SUMMARY OF THE INVENTION

The present invention is based on the discovery that by giving the phosphorus-accumulating micro-organisms such growth conditions that mainly micro-organisms capable of using nitrate as an oxidant and thus capable of absorbing phosphorus in anoxic condition and storing it in the form of polyphosphate are developed, a substantially improved exploitation of organic matter contained in the polluted water is obtained, thereby avoiding altogether or reducing the addition of organic matter to polluted water which is poor in organic matter.

The process according to the invention is characterized in that, on the one hand, the anaerobic and the anoxic treatment, and on the other hand, the aerobic treatment, are carried out in the presence of separate micro-organism cultures.

The term "separate micro-organism cultures" denotes that the major part of the micro-organism culture(s) used in the anaerobic and anoxic treatments is kept apart from the micro-organism culture(s) used in the aerobic treatment. In practice the liquid which has been subjected to an anaerobic/anoxic treatment and which is subsequently to undergo an aerobic treatment, will unavoidably contain small amounts of micro-organisms originating from the anaerobic/anoxic treatments, and minor amounts of micro-organisms may also be transported from the aerobic treatment step to the anaerobic/anoxic treatment steps along with recycled water.

In the known methods of the kind described above, a mixture containing i.a. phosphorus-accumulating heterotrophic bacteria, phosphorus-accumulating denitrificating heterotrophic bacteria, non-phosphorus-accumulating denitrificating heterotrophic bacteria and nitrificating bacteria will successively be subjected to anaerobic, anoxic and aerobic conditions and consequently they are sometimes exposed to conditions in which they are not active. In other words, part of the bacteria are inactive for a part of the time and in some process steps they will take up space for active bacteria.

By using separate micro-organism cultures in the anaerobic/anoxic and aerobic treatments, respectively, of the polluted water in accordance with the present invention, principally propagation of micro-organisms adapted to live in anaerobic/anoxic and aerobic conditions, respectively, is effected. Thereby a larger part of the micro-organisms becomes active in the treatment steps mentioned, which i.a. results in that the ratio of phosphorus-accumulating micro-organisms capable of using nitrate as an oxidant to phosphorus-accumulating micro-organisms capable of using only oxygen as an oxidant, is shifted in favour of the former whereby, as explained above, improved exploitation of the organic matter contained in the polluted water is obtained.

In addition to an improved exploitation of organic matter, the process according to the invention presents the advantage that the reaction rate per unit mass of biomass is increased, thereby allowing the amount of biomass to be reduced or the total reaction rate of the plant to be increased.

The process according to the invention may by used either in a suspension method or in a fixed-bed method or in a combination of the two methods.

In the former method a mixture of polluted water, such as waste water which may optionally have been subjected to a preclarification treatment, and a micro-organism culture, are successively subjected to an anaerobic and an anoxic treatment in one or more treatment zones following which the micro-organism culture is separated from the water and then another micro-organism culture is added to the water and subsequently the mixture thus formed is subjected to treatment in an aerobic treatment zone, and wherein the micro-organism culture is separated from the water thus treated and a part of the water is recycled to the anoxic treatment zone.

In the method described above recycling is preferably carried out of the micro-organism culture which is separated off after the anoxic treatment and the separated culture or a part thefor is recycled to the anaerobic zone.

In a corresponding manner the micro-organism culture separated from the aerobically treated water may be recycled to the aerobic treatment zone.

Such separation is carried out, e.g., in a precipitation tank.

According to a particular embodiment of the process described above, the anaerobic and the anoxic treatments are carried out in two separate treatment zones wherein anaerobic and anoxic conditions are alternatingly established and wherein polluted water is always conducted to the zone where anaerobic conditions are maintained.

The excess micro-organisms used in connection with the anaerobic/anoxic treatments are preferably removed at such times when the phosphorus content of the micro-organisms is high.

In the fixed-bed method at least two immobilised micro-organism cultures which are kept in anaerobic or anoxic and aerobic conditions, respectively, are used and, wherein a part of the water which leaves the micro-organism culture kept in aerobic conditions is recycled to the micro-organism culture which is kept in anoxic conditions.

In this method the first immobilised micro-organism culture is preferably kept in alternatingly anaerobic and anoxic conditions and the polluted water is conducted to the immobilised micro-organism culture which is kept in anaerobic conditions.

According to a preferred embodiment of the above process three immobilised micro-organism cultures are used and the two first immobilised micro-organism cultures of the three are alternatingly kept in anaerobic and anoxic conditions and polluted water is alternatingly conducted to the first and the second of the two first immobilised micro-organism cultures, polluted water, however, always being conducted to the immobilised micro-organism culture which is kept in anaerobic conditions whereas the discharge from the immobilised micro-organism culture which is kept in anaerobic conditions is conducted to the second of the two first immobilised micro-organism cultures together with nitrate-containing water recycled from the immobilised micro-organism culture which is kept in aerobic conditions.

As mentioned the two methods described above may be combined. The aerobic treatment in the former method may for example be carried out using an immobilised micro-organism culture, viz. by conducting the water which has been subjected to successive anaerobic and anoxic treatments through an immobilised aerobic micro-organism culture and by recycling a part of the water thus aerobically treated to the anoxic treatment zone.

In a corresponding manner the anaerobic and the anoxic treatments may be carried out using one or more immobilised micro-organism cultures following which the water thus treated may be subjected to an aerobic treatment in the presence of micro-organisms suspended in the water.

A particularly preferred embodiment of the process according to the invention is characterized in successively subjecting the polluted water to an anaerobic and an anoxic treatment in two zones using a suspended micro-organism culture, separating the micro-organism culture from the water thus treated, the micro-organism culture being recycled to the anaerobic treatment zone, and subjecting the water relieved of the micro-organism culture to an aerobic treatment with an immobilised micro-organism culture following which a part of the aerobically treated water is recycled to the anoxic treatment step.

The excess micro-organisms used in connection with the anaerobic/anoxic treatments are preferably removed at such times when the phosphorus content of the micro-organisms is high.

The invention also relates to a plant for carrying out the process described above.

The plant according to the invention is characterized in that it comprises means for successively subjecting polluted water to an anaerobic and an anoxic treatment using a first micro-organism culture, means for subjecting the anaerobically and anoxically treated water to an aerobic treatment using a second micro-organism culture which is different from the first micro-organism culture, means for recycling aerobically treated water to the means for treating the water in anoxic conditions and optionally means for removing the excess sludge from the plant.

A preferred embodiment of the plant described above is characterized in that the means for anaerobic and anoxic treatment of the water using the first micro-organism culture comprise an anaerobic and an anoxic tank, means for separating off sludge from the anoxically treated water and means for recycling the sludge thus separated to the anaerobic tank.

A second preferred embodiment of the plant described above is characterized in that the means for anaerobic and anoxic treatment of the water using the first micro-organism culture comprise at least one biological filter comprising a carrier material to which the micro-organism culture is attached.

A further preferred embodiment of the plant described above is characterized in that the means for aerobic treatment of the anaerobically and anoxically treated water using the second micro-organism culture comprise an aerobic tank, means for separating sludge from the aerobically treated water and means for recycling the sludge thus separated to the aerobic tank.

Yet another preferred embodiment of the plant described above is characterized in that the means for aerobic treatment of the anaerobically and anoxically treated water using the second micro-organism culture comprise a biological filter comprising a carrier material to which the micro-organism culture is attached.

The biological filters used are preferably constructed such that they retain suspended matter contained in the water.

Preferably, the plant comprises further means for periodical backwashing of the filters for removal of excess micro-organism containing material from the filters.

Alternatively, there may also be a separate separation means, e.g., in the form of an additional filter, a precipitation tank or a flotation plant for the separation of suspended matter, including micro-organisms from water leaving the filters.

The plant may further comprise means for periodically providing an increased hydraulic load on the filters. Such means serve to achieve increased removal of micro-organisms from the filters at desired points in time.

A particularly preferred embodiment of the plant according to the invention comprises three biological filters connected in series wherein anaerobic, anoxic and aerobic conditions, respectively, may be maintained, and where it further comprises means for alternatingly conducting polluted water to the two first filters and for alternatingly changing the treatment conditions in the filters from anaerobic to anoxic treatment and vice versa thereby establishing anaerobic conditions in the filter to which the polluted water is first conducted.

To maintain a sufficiently heavy flow of water through the filters it may be convenient to recycle a part of the water which leaves a filter to the inlet of that filter.

Finally, it should be noted that the anaerobic treatment may be effected in more successive hydraulically separated treatment zones or tanks and that the same applies to the anoxic and aerobic treatments.

In this connection it should be noted that the polluted water may be supplied to one or more of the anaerobic zones.

In a corresponding manner and where filters are used, several successive filters may be used wherein the same treatment conditions are maintained and in such instances the polluted waste water may also be fed to one or more anaerobically operating filters.

In the same manner the anaerobically treated water may be distributed to several anoxic filters.

BRIEF DESCRIPTION OF THE DRAWINGS

The invention will now be described in detail with reference to the drawings, wherein FIG. 3 is a flow diagram illustrating an alternative aerobic treatment of waste water which has been subjected to an anaerobic and an anoxic treatment in a plant as shown in FIGS. 1 and 2, FIG. 4 is a flow diagram illustrating a further embodiment of a purification plant according to the invention.

DETAILED DESCRIPTION OF THE PREFERRED EMBODIMENTS

Figure 1:
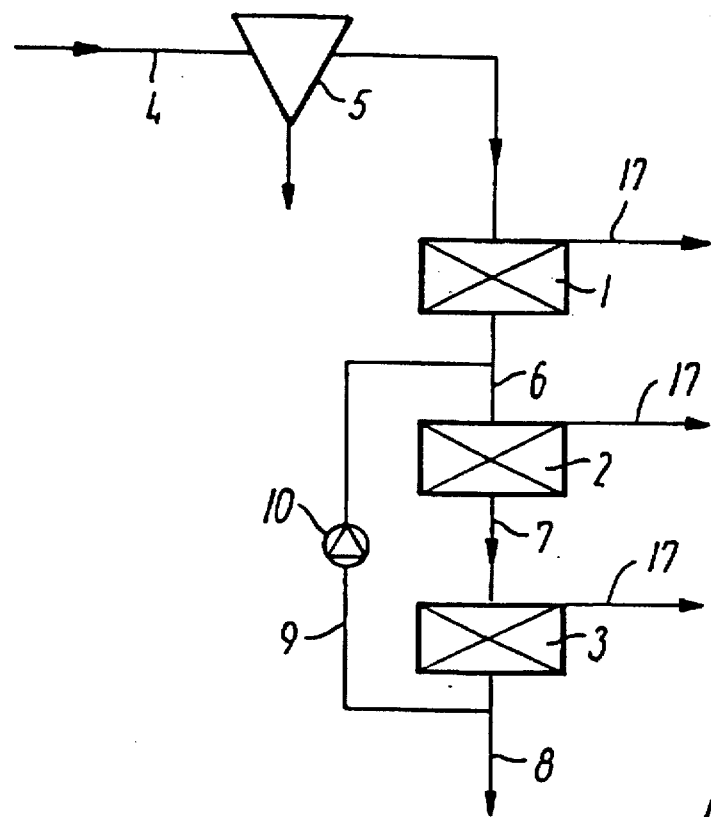
FIG. 1 is a flow diagram illustrating phase 1 of the operation of a preferred embodiment of a water purification plant according to the invention.

The purification plant shown in FIG. 1 comprises three filters 1,2,3 connected in series, each comprising a carrier material and an (immobilised) bacteria culture attached thereto. The filter 1 is connected to a feed conduit 4 for the supply of untreated waste water. In the feed conduit 4 a precipitation tank 5 may be positioned for the removal of a part of the suspended solid matter contained in the untreated waste water. The plant further comprises a conduit 6 which connects the filter 1 to the filter 2, and a conduit 7 which connects the filter 2 to the filter 3. Lastly the plant shown comprises a conduit 8 for the discharge of purified waste water from the filter 3 and a recycling conduit 9, wherein a pump 10 is located. The conduit 9 connecting the conduit 8 to the conduit 6 serves to conduct a part of the purified waste water leaving the filter 3 through the conduit 8 back to the filter 2.

Figure 2:
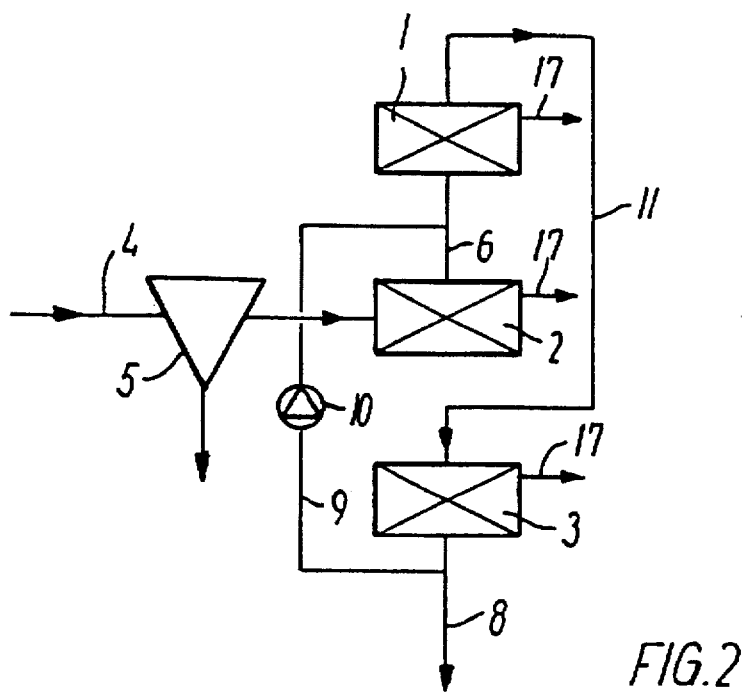
FIG. 2 is a flow diagram illustrating phase 2 of the operation of the purification plant described in connection with FIG. 1.

As will appear from FIG. 2, the plant shown therein corresponds to the one shown in FIG. 1 except that the feed conduit 4 and the precipitation tank 5 located therein are connected to the filter 2 and that the conduit 7 connecting filters 2 and 3 has been replaced by a conduit 11 connecting filters 1 and 3.

In phase 1 anaerobic conditions are maintained in the filter 1 which results in the phosphorus-accumulating bacteria attached to the carrier material absorbing easily decomposable organic matter contained in the untreated waste water and simultaneously releasing phosphate ions. The water flowing through the conduit 6 from the filter 1 to the filter 2 and which contains relatively large amounts of phosphate ions is mixed with nitrate-containing water which is supplied through the conduit 9 from the filter 3.

In the filter 2 there prevails anoxic conditions and the phosphorus-accumulating bacteria present therein consume their storages of organic matter using nitrate as an oxidant. Hereby nitrate is reduced to free nitrogen, which leaves in its gaseous form. The bacteria use the energy thus produced partly for basic metabolism and growth and partly for storaging phosphate in the form of polyphosphate. The partially treated water from the filter 2 flows through the conduit 7 to the filter 3 wherein aerobic conditions are maintained. This means that a biological conversion of ammonia nitrogen into nitrate is effected therein simultaneously with any organic matter present being decomposed. Hereby nitrate-containing waste water is produced of which a part is recycled to the filter 2 through the recycling conduit 9.

After a suitable period the plant is changed over by supplying the untreated waste water to the filter 2 as shown in FIG. 2 and the water leaving the filter 2 is conducted to the filter 1 through the conduit 6 from where, following treatment, it is conducted to the filter 3 through the conduit 11.

In phase 2 anaerobic conditions are maintained in the filter 2 and anoxic conditions in the filter 1, whereas aerobic conditions are maintained in the filter 3 like in phase 1.

After a suitable period of time, the plant is again changed over and a new phase 1 is initiated.

In the described embodiment of the process according to the invention an accumulation of phosphorus-accumulating bacteria is effected in filters 1 and 2 and part of the bacteria are removed from the filters at intervals by backwashing when the phosphorus storages of the bacteria are full.

FIG. 3 shows a conduit 12 for anaerobically and anoxically-treated waste water wherein a filter 13 is located which contains a carrier (filter) medium which effectively retains suspended matter, and a bacteria culture. A recycling conduit 14 wherein an additional filter 15 and a recycling pump 16 for nitrate-containing water are located is on the one hand connected to the conduit 12 on the upstream side of the filter 13 and on the other to the conduit 6 in FIGS. 1 and 2.

As opposed to the filter 13 and in addition to a microorganism culture, the filter 15 comprises a comparatively coarse carrier (filter) medium. By using such coarse filter medium the pressure loss in the recycling conduit 14 is reduced. Aerobic conditions are maintained in the filter 13 as well as in the filter 15.

Excess biomass from the filters 1, 2, 3 and 13 and 15 may be removed by backwashing of the filters with water. The excess biomass is removed together with the washing water through the conduits 17.

The water purification plant shown in FIG. 4 comprises a tank 20 with a feed conduit 21 for untreated waste water and a communication conduit 22 connected to an additional tank 23. The latter is connected to an additional tank 26 through a conduit 24 wherein a precipitation tank 25 is located, the tank 26 having a discharge conduit 27 wherein a precipitation tank 28 is located. The bottom of the precipitation tank 25 is connected to the feed conduit 21 through a sludge recycling conduit 29 wherein a pump 30 is located and the bottom of the precipitation tank 28 is connected to the conduit 24 through a sludge recycling conduit 31 wherein a sludge pump 32 is located. Lastly the plant comprises a water recycling conduit 33, wherein a pump 34 is located and which is connected to the discharge conduit 27 on the downstream side of the precipitation tank 28 and the communication conduit In the plant shown the untreated waste water supplied through the supply conduit 21 is mixed with recycled sludge supplied through the sludge recycling conduit 29 and the mixture is introduced into the tank 20 wherein anaerobic conditions are maintained. The anaerobically treated water and sludge are introduced into the tank 23 following admixture with nitrate-containing water supplied through the water recycling conduit 33. In the tank 23 anoxic conditions are maintained. After leaving the tank 23 the water flows through the conduit 24 to the precipitation tank 25 wherein sludge is separated off and further to the tank 26 wherein aerobic conditions are maintained. From the bottom of the precipitation tank 25 active sludge is removed and conducted through the sludge recycling conduit 29 to the feed conduit 21.

The aerobically treated water flows from the tank 26 to the precipitation tank 28 and further through the discharge conduit 27 from where a part of the nitrate-containing water is removed and recycled to the communication conduit 22 through the water recycling conduit 33. Lastly active sludge removed through the bottom of the precipitation tank 28 is conducted back to the conduit 24.

In the tanks 20, 23 and 26 processes identical to the ones explained in connection with the disclosures of FIGS. 1 and 2 are carried out.

Excess biomass can be removed from the plant through the conduits 35 and 36 from the precipitation tanks 25 and 28, respectively.

Figure 5:
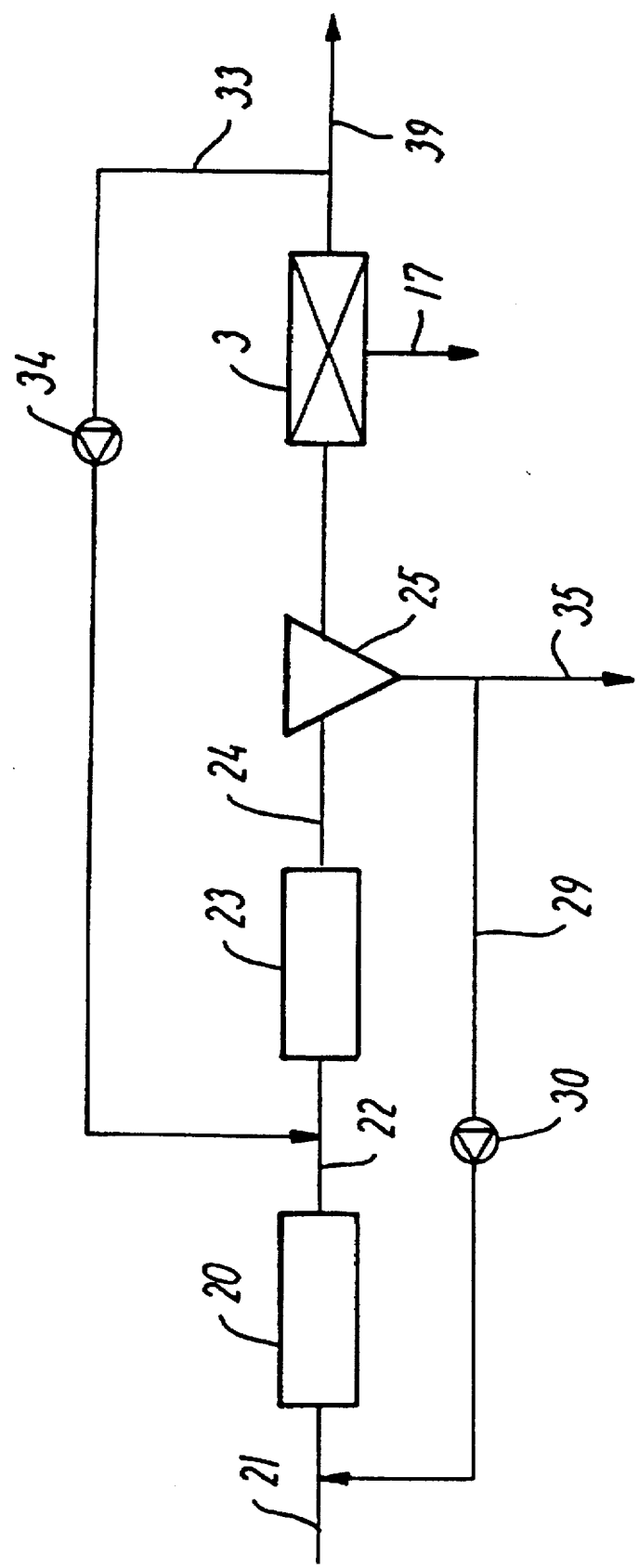
FIG. 5 is a flow diagram illustrating yet a preferred embodiment of a water purification plant according to the invention.

The water purification plant shown in FIG. 5 comprises a tank 20 with an feed conduit 21 for untreated waste water and a communication conduit 22 connected to an additional tank 23.

The latter is connected to a filter 3 through a conduit 24 wherein a precipitation tank 25 is located, the filter 3 having a discharge conduit 39. The bottom of the precipitation tank 25 is connected to the feed conduit 21 through a sludge recycling conduit 29 wherein a pump 30 is located. Lastly the plant comprises a water recycling conduit 33 wherein a pump 34 is located and which is connected to the discharge conduit 39 and the communication conduit 22.

In the plant shown the polluted water supplied through the supply conduit 21 is mixed with recycled sludge supplied through the sludge recycling conduit 29 and the mixture is introduced into the tank 20 wherein anaerobic conditions are maintained. The anaerobically treated water and sludge are introduced into the tank 23 following admixture with nitrate-containing water supplied through the water recycling conduit 33. In the tank 23 anoxic conditions are maintained. After leaving the tank 23 the water flows through the conduit 24 to the precipitation tank 25 wherein sludge is separated off and further to the filter 3 wherein aerobic conditions are maintained. From the bottom of the precipitation tank 25 active sludge is removed and a part thereof is conducted through the sludge recycling conduit 29 to the feed conduit 21.

The aerobically treated water flows from the filter 3 through the discharge conduit 39 from where a part of the nitrate-containing water is removed and recycled to the communication conduit 22 through the water recycling conduit 33.

In the filter 3 and the tanks 20 and 23 the same processes as explained in connection with FIGS. 1 and 2 are effected.

We claim:

1. A process for the biological purification of polluted water comprising the steps of subjecting the polluted water to successive anaerobic, anoxic and aerobic treatments in the presence of first and second separate cultures of microorganisms, the treatment in the presence of the first culture of microorganisms being carried out solely under anaerobic and anoxic conditions and the treatment in the presence of the second culture of microorganisms being carried out under aerobic conditions.

2. A process according to claim 1, comprising the steps of successively subjecting a mixture of polluted water and a suspended microorganism culture to an anaerobic and an anoxic treatment in one or more treatment zones, separating the microorganisms from the water, adding another microorganism culture to the water, subjecting the mixture thus formed to treatment in one or more aerobic treatment zones, separating the micro-organism culture from the water thus treated, and recycling a part of the separated water to the anoxic treatment zone.

3. A process according to claim 2, including the step of recycling at least part of the suspended micro-organism culture separated after treatment in the anoxic treatment zone to the anaerobic treatment zone.

4. A process according to claims 2, including the step of recycling at least part of the micro-organism culture separated from the aerobically treated water to the aerobic treatment zone.

5. A process according to claim 2, wherein the anaerobic and anoxic treatments occur in two separate treatment zones, and including the steps of alternatively maintaining anaerobic and anoxic conditions in said separate treatment zones, and feeding polluted water to the zone where anaerobic conditions are maintained.

6. A process according to claim 1, including the steps of using at least two immobilised micro-organism cultures which are kept in anaerobic or anoxic and aerobic conditions, respectively, and recycling a part of the water which leaves the micro-organism culture kept in aerobic conditions to the micro-organism culture which is kept in anoxic conditions.

7. A process according to claim 6, including the steps of using three immobilised micro-organism cultures and keeping the two first micro-organism cultures of the three in alternatingly anaerobic and anoxil conditions, and conducting polluted water alternatingly to the first and the second of the two first immobilised micro-organism cultures, wherein polluted water is always fed to the micro-organism culture which is kept in anaerobic conditions whereas the discharge from the immobilised micro-organism culture which is kept in anaerobic conditions is conducted to the second of the two first immobilised micro-organism cultures together with nitrate-containing water recycled from the immobilised micro-organism culture which is kept in anaerobic conditions.

8. A process according to claim 1, including the steps of successively subjecting the polluted water to an anaerobic and an anoxic treatment in two zones using a suspended micro-organism culture, separating the micro-organism culture from the water thus treated, said micro-organism culture being recycled to the anaerobic treatment zone, and subjecting the water relieved of the micro-organism culture to an aerobic treatment with an immobilised micro-organism culture following which a part of the aerobically treated water is recycled to the anoxic treatment step.

9. An apparatus for the biological treatment of polluted water which comprises means for successively subjecting polluted water to an anaerobic and an anoxic treatment solely under anaerobic and anoxic conditions using a first micro-organism culture, means for subjecting the anaerobically and anoxically treated water to an aerobic treatment using a second micro-organism culture which is different and separate from the first micro-organism culture, and means for recycling aerobically treated water to the means for treating the water in anoxic conditions.

10. An apparatus according to claim 9, wherein the means for anaerobic and anoxic treatment of the water using the first micro-organism culture comprise an anaerobic and an anoxic tank, means for separating off sludge from the anoxically treated water and means for recycling the sludge thus separated to the anaerobic tank.

11. An apparatus according to claim 9, wherein the means for anaerobic and anoxic treatment of the water using the first micro-organism culture comprise at least one biological filter comprising a carrier material to which the micro-organism culture is attached.

12. An apparatus according to claim 11, including further means for periodical backwashing of the filters for removal of excess micro-organism containing material from the filters.

13. An apparatus according to claim 9 wherein the means for aerobic treatment of the anaerobically and anoxically treated water using the second microorganism culture comprise an aerobic tank, means for separating sludge from the aerobically treated water and means for recycling the sludge thus separated to the aerobic tank.

14. An apparatus claim 9, wherein the means for aerobic treatment of the anaerobically and anoxically treated water using the second micro-organism culture comprise a biological filter comprising a carrier material to which the micro-organism culture is attached.

15. An apparatus according to claim 9, including three biological filters connected in series wherein anaerobic, anoxic and aerobic conditions, respectively, can be maintained, and means for alternatingly feeding polluted water to the two first filters and for alternatingly changing the treatment conditions in said filters from anaerobic to anoxic treatment and vice versa.

* * * * *